US 6,549,864 B1

(12) United States Patent
Potyrailo

(10) Patent No.: US 6,549,864 B1
(45) Date of Patent: Apr. 15, 2003

(54) MULTIVARIATE STATISTICAL PROCESS ANALYSIS SYSTEMS AND METHODS FOR THE PRODUCTION OF MELT POLYCARBONATE

(75) Inventor: Radislav Alexandrovich Potyrailo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,273

(22) Filed: Aug. 13, 2001

(51) Int. Cl.[7] .............................................. G09F 19/00
(52) U.S. Cl. ........................................ 702/81; 364/486
(58) Field of Search ..................... 700/108; 264/210.2; 702/182, 8

(56) References Cited

U.S. PATENT DOCUMENTS

| | | | |
|---|---|---|---|
| 5,257,206 A | 10/1993 | Hanson | 364/502 |
| 5,311,759 A | 5/1994 | Mangrulkar et al. | 72/12 |
| 5,339,257 A | 8/1994 | Layden et al. | 364/552 |
| 5,351,202 A | 9/1994 | Kurtzberg et al. | 364/552 |
| 5,408,405 A | 4/1995 | Mozumder et al. | 364/151 |
| 5,423,199 A | 6/1995 | Mangrulkar | 72/3 |
| 5,440,478 A | 8/1995 | Fisher et al. | 364/188 |
| 5,442,562 A * | 8/1995 | Hopkins et al. | 700/108 |
| 5,521,814 A | 5/1996 | Teran et al. | 364/402 |
| 5,529,730 A * | 6/1996 | Gross | 264/210.2 |
| 5,554,954 A | 9/1996 | Takahashi | 327/546 |
| 5,602,752 A | 2/1997 | Jankovic | 364/487 |
| 5,617,321 A | 4/1997 | Frizelle et al. | 364/468.1 |
| 5,640,491 A | 6/1997 | Bhat et al. | 395/22 |
| 5,640,493 A | 6/1997 | Skeirik | 395/23 |
| 5,658,423 A | 8/1997 | Angell et al. | 438/9 |
| 5,787,021 A | 7/1998 | Samaha | 364/552 |
| 5,815,397 A | 9/1998 | Saito et al. | 364/475.09 |
| 5,841,676 A | 11/1998 | Ali et al. | 364/552 |
| 5,850,339 A | 12/1998 | Giles | 364/148 |
| 5,864,483 A | 1/1999 | Brichta | 364/468.16 |
| 5,864,773 A * | 1/1999 | Barna et al. | 702/182 |
| 5,905,989 A | 5/1999 | Biggs | 707/104 |
| 5,987,398 A | 11/1999 | Halverson et al. | 702/179 |
| 6,061,640 A | 5/2000 | Tanaka et al. | 702/81 |

FOREIGN PATENT DOCUMENTS

| | | |
|---|---|---|
| JP | 2153925 | 6/1990 |
| JP | 6032886 | 2/1994 |
| JP | WO 00/37531 | 6/2000 |

* cited by examiner

Primary Examiner—Kamini Shah
Assistant Examiner—Xiuquin Sun
(74) Attorney, Agent, or Firm—Noreen C. Johnson; Christian G. Cabou

(57) ABSTRACT

Computerized process control systems and methods for the production of melt polycarbonate include a plurality of sensors for obtaining a plurality of measurements relating to a plurality of predetermined process variables, a preprocessor for preprocessing each of the plurality of measurements for multivariate statistical analysis, an identifier for identifying which of the plurality of predetermined process variables affect each of a plurality of predetermined product variables, a correlator for correlating the plurality of predetermined process variables and the plurality of predetermined product variables, and a model generator for modeling the relationship between the plurality of predetermined process variables and the plurality of predetermined product variables. The plurality of predetermined process variables are analyzed to predict polymer performance and/or to ensure that the value of each of the plurality of predetermined process variables is within a predetermined range.

29 Claims, 12 Drawing Sheets

MULTIVARIATE STATISTICAL PROCESS ANALYSIS SYSTEMS AND METHODS FOR THE PRODUCTION OF MELT POLYCARBONATE

BACKGROUND OF INVENTION

The present invention is directed to systems and methods for the control of chemical manufacturing processes and, more specifically, to multivariate statistical process analysis systems and methods for the production of melt polycarbonate.

Manufacturing process variables ($X_i$) such as flows, pressures, concentrations, temperatures, and others have traditionally been subject to statistical process control (SPC) strategies. These SPC strategies, introduced in the 1930's, include a variety of statistical methods designed to maintain process quality and productivity. The statistical methods focus on a single variable $X_i$ at a time, using univariate controls such as Shewhart charts, cumulative sum charts, and exponentially-weighted moving average charts. Such charts are used to monitor the performance of a process, such as a chemical manufacturing process, over time to verify that the process consistently operates within the production specifications of a given product.

As the number of monitored variables $X_i$ affecting the behavior of a manufacturing process increases, however, univariate SPC methods become inadequate. The application of these techniques in such situations may result in misleading information being presented to a process operator, leading him or her to take unnecessary or erroneous control actions.

An alternative approach is to employ multivariate statistical process analysis (MSPA) methods to extract more relevant information from measured data. MSPA methods provide the staff of a manufacturing plant, for example, with a greater understanding of process performance, allowing them to make sound business decisions. Thus, the application of multivariate methodologies to industrial manufacturing processes has experienced increasing popularity in recent years. For example, MSPA methods have been utilized in emulsion polymerization, low-density continuous polyethylene polymerization, batch polymerization, and pilot-scale penicillin fermentation processes. Similarly, MSPA methods have been utilized to improve the productivity of a titanium dioxide plant, monitor the processing conditions of a nuclear waste storage tank, and control the performance of chromatographic instrumentation.

The application of multivariate statistical analysis methods to industrial process data characterized by a large number of correlated chemical process measurements is the area of process chemometrics. The objectives of process chemometrics include the determination of key process variables, the generation of inference models used to forecast and optimize product quality, the detection and diagnosis of faults and potential process abnormalities, and the overall monitoring of chemical processes to ensure production control. Achieving these goals is often difficult with regard to the production of melt polycarbonate, however, as the determination of key process variables may be an inexact and time consuming process, and accurate and reliable inference models may be difficult to generate.

SUMMARY OF INVENTION

Thus, the present invention is directed to automated multivariate statistical process analysis systems and methods for the production of melt polycarbonate. These systems and methods allow process variables causing abnormal performance to be detected and identified. As a result, a manufacturing plant staff may better understand process performance and make sound business decisions.

In one embodiment, a computerized system for the production of melt polycarbonate includes a plurality of sensors for obtaining a plurality of measurements relating to a plurality of predetermined process variables, a preprocessor for preprocessing each of the plurality of measurements for multivariate statistical analysis, an identifier for identifying which of the plurality of predetermined process variables affect each of a plurality of predetermined product variables, a correlator for correlating the plurality of predetermined process variables and the plurality of predetermined product variables, a model generator for modeling the relationship between the plurality of predetermined process variables and the plurality of predetermined product variables, and an analyzer for analyzing the plurality of predetermined process variables to predict polymer performance and/or to ensure that the value of each of the plurality of predetermined process variables is within a predetermined range.

In another embodiment, a computerized method for the production of melt polycarbonate includes the steps of obtaining a plurality of measurements relating to a plurality of predetermined process variables, preprocessing each of the plurality of measurements for multivariate statistical analysis, identifying which of the plurality of predetermined process variables affect each of a plurality of predetermined product variables, correlating the plurality of predetermined process variables and the plurality of predetermined product variables, modeling the relationship between the plurality of predetermined process variables and the plurality of predetermined product variables, and analyzing the plurality of predetermined process variables to predict polymer performance and/or to ensure that the value of each of the plurality of predetermined process variables is within a predetermined range.

DETAILED DESCRIPTION

Polycarbonates are typically prepared from dihydric phenol compounds and carbonic acid derivatives. For example, one important polycarbonate, melt polycarbonate, may be prepared via the melt polymerization of diphenyl carbonate and Bisphenol A (BPA). The reaction is conducted at high temperatures, allowing the starting monomers and product to remain molten while the reactor pressure is staged in order to more effectively remove phenol, the by-product of the polycondensation reaction.

During the melt polycarbonate manufacturing process, data may be collected via sensors in order to monitor process performance. Using this collected information, the relative importance of various process variables ($X_i$) may be determined and an inference model may be developed to predict such outcomes as Fries concentration, pellet intrinsic viscosity (IV), melt polycarbonate grade, and other product parameters. Further, process variables $X_i$ causing abnormal performance may be detected and identified. As a result, a manufacturing plant staff may better understand process performance and make sound business decisions.

Figure 1:
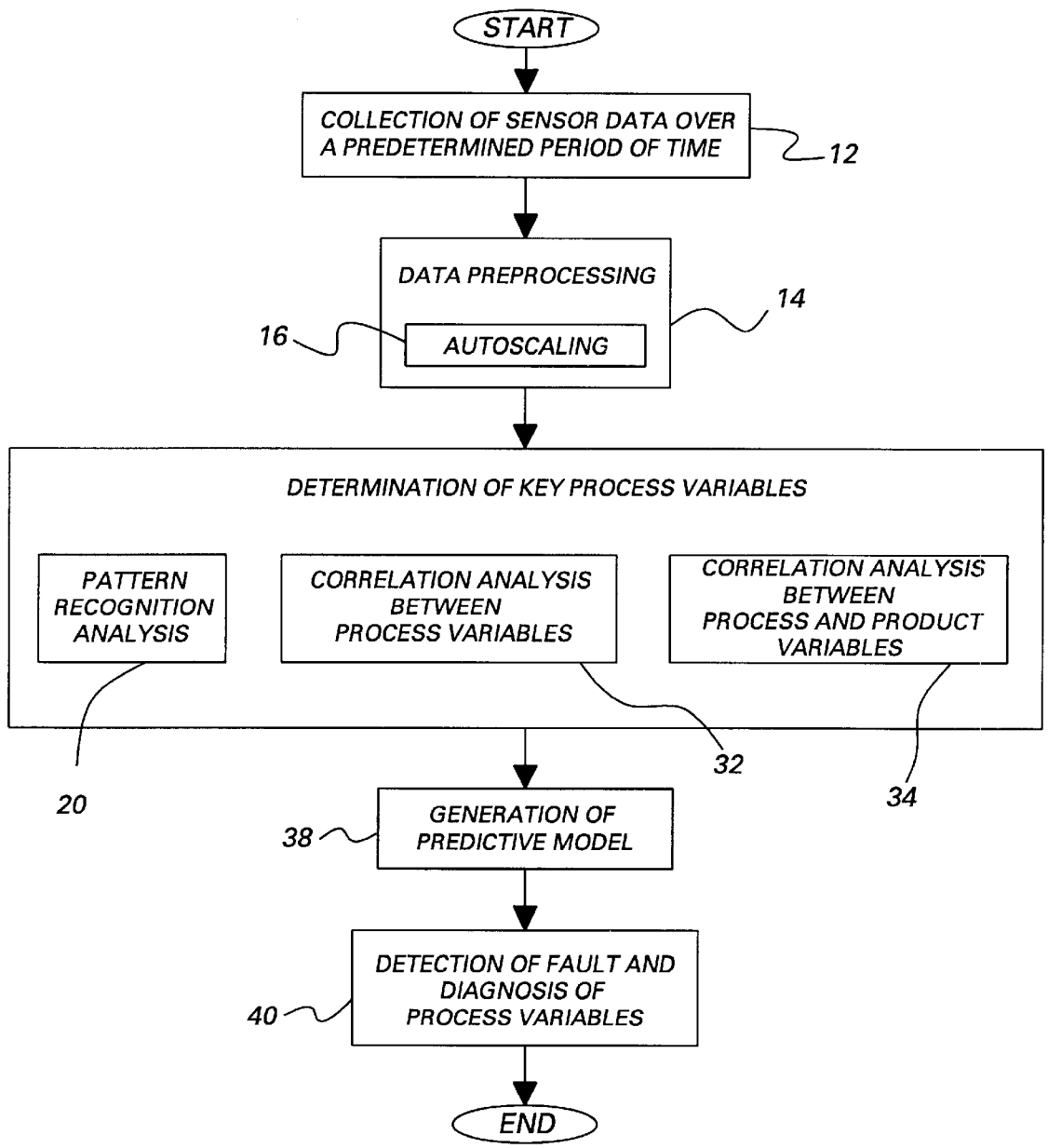
FIG. 1 is a flow chart of a computerized multivariate statistical process analysis method for the production of melt polycarbonate.

Referring to FIG. 1, a multivariate statistical process analysis (MSPA) method 10 for the consistent production of melt polycarbonate begins with the collection of sensor data over a predetermined period of time 12. For example, data from one melt polycarbonate manufacturing plant included information about process variables $X_i$ and product variables $Y_i$ from about 343 polymerization runs. For each polymerization run, process variables $X_i$ and product variables $Y_i$ were recorded once. A list of process variables $X_i$ and product variables $Y_i$ used for multivariate analysis is presented in Table 1.

TABLE 1

Process and Product Variables

| Process Variables $X_i$ | Product Variables $Y_i$ |
| --- | --- |
| 1. Molar Ratio | 1. Fries Concentration |
| 2. Flow Rate | 2. Melt Flow Ratio (MFR) |
| 3. Adjusted Molar Ratio | 3. Pellet Intrinsic Viscosity (IV) |
| 4. Vacuum in R3 | 4. End Cap (EC) |
| 5. Temperature in R3 | 5. Yellowness Index (YI) |
| 6. Torque in R3 | 6. Melt Polycarbonate Grade |
| 7. Discharge Pressure in R3 | |
| 8. Melt Viscosity in R3 | |
| 9. Vacuum in R4 | |
| 10. Temperature in R4 | |
| 11. Stirring Speed in R4 | |
| 12. Torque in R4 | |
| 13. Discharge Pressure in R4 | |
| 14. Melt Viscosity in R4 | |
| 15. Throughput | |
| 16. Pellet Speed | |

In the above table, "R3" and "R4" refer to specific polymerization stages within the physical melt polycarbonate manufacturing system. An exemplary description of such polymerization stages is presented in International Patent Application WO 00/37531.

The variables used for multivariate analysis are further described in Table 2.

TABLE 2

Description of Variables

| Variable | Units | Description |
| --- | --- | --- |
| Molar Ratio | — | Ratio of moles of DPC to moles of BPA |
| Flow Rate | kg/hour | Flow rate of the monomer mix into R1 oligomerization reactor |
| Adjusted Molar Ratio | — | Ratio of moles of DPC (and additional moles of DPC) to moles of BPA |
| Vacuum in R3 | torr | Measured in headspace of R3 stage using a pressure gauge |
| Temperature in R3 | degrees C. | Temperature of reaction components in R3 |
| Torque in R3 | N*m | Torque on a stirrer in R3 reactor |
| Discharge Pressure in R3 | torr | Pressure after the gear pump in the 3rd reactor stage |
| Melt Viscosity in R3 | poise | Melt viscosity of reaction components in R3 |
| Vacuum in R4 | torr | Measured in headspace of R4 stage using a pressure gauge |
| Temperature in R4 | degrees C. | Temperature of reaction components in R4 |
| Stirring Speed in R4 | RPM | Speed of a shaft in R4 reactor |
| Torque in R4 | — | Torque on a shaft in R4 reactor |
| Discharge Pressure in R4 | torr | Pressure in the 4th reactor |
| Melt Viscosity in R4 | poise | Melt viscosity of reaction components in R4 |
| Throughput | kg/h | Amount of polycarbonate material per unit of time coming fom the last reactor stage |
| Pellet Speed | m/s | Speed of a polycarbonate strand entering the pelletizer |
| Fries Concentration | ppm | Concentration of Fries product measured by LC |
| Melt Flow Ratio (MFR) | g/10 min | Measure of weight in grams extruded througn a capillary for a 10 min test |
| Pellet Intrinsic Viscosity (IV) | dL/g | Measured at 20 degrees C. on a solution of a sample in methylene chlorine |
| End Cap (EC) | % | Calculated from measured concentration of terminal OH groups |
| Yellowness Index (YI) | — | Yellowness index of pellets |
| Melt Polycarbonate Grade | — | Based upon Fries concentration, MFR, and EC |

Prior to multivariate analysis, gathered data may be preprocessed 14. For example, the process data may be arranged as a matrix of samples and product variables $Y_i$. The product variables $Y_i$ may be used to label data points after applying pattern recognition tools. The process variables $X_i$ and product variables $Y_i$ in the data set may, however, have different physical measurement units. This difference in units between the variables may be eliminated by autoscaling the data 16. Autoscaling is typically the application of both variance scaling and mean centering. The data may be autoscaled by subtracting the mean and dividing by the standard deviation for each variable:

$$X_{ij}^a = (x_{ij} - \bar{x}_j)/\sigma_j, \quad (1)$$

where $X^a_{:,:}$ is the autoscaled matrix X of size i×j and and $\sigma_j$ are the mean and standard deviation of the ith column of the original matrix X. Thus, each column of the autoscaled matrix has zero mean and unit standard deviation.

Following the data preprocessing step 14, as part of the determination of key process variables step 18, information about the relations between the process variables $X_i$ and their effects on the product variables $Y_i$ may be obtained using principal components analysis (PCA) tools 20. PCA is a multivariate data analysis tool that projects a data set onto a subspace of lower dimensionality. In this reduced space, data is represented with reduced colinearity. PCA achieves this objective by describing the variance of the preprocessed data matrix $X^a$ (Eq. 1) in terms of the weighted sums of the original variables with no significant loss of information. These weighted sums of the original variables are called principal components (PCs). The preprocessed matrix $X^a$ is decomposed into a set of scores T (I×K) and loadings P (J×K), where K is the number of principal components. Preferably, the number of PCs is chosen to be as few as possible to explain important variation in the data set. The matrix $X^a$ is then expressed as a linear combination of orthogonal vectors along the directions of the PCs:

$$X^a = t_1 p_1^T + t_2 p_2^T + \ldots + t_A p_K^T + E, \quad (2)$$

where $t_i$ and $p_i$ are the score and loading vectors, respectively, E is a residual matrix that represents random error, and T is the transpose of the matrix.

Figure 2:
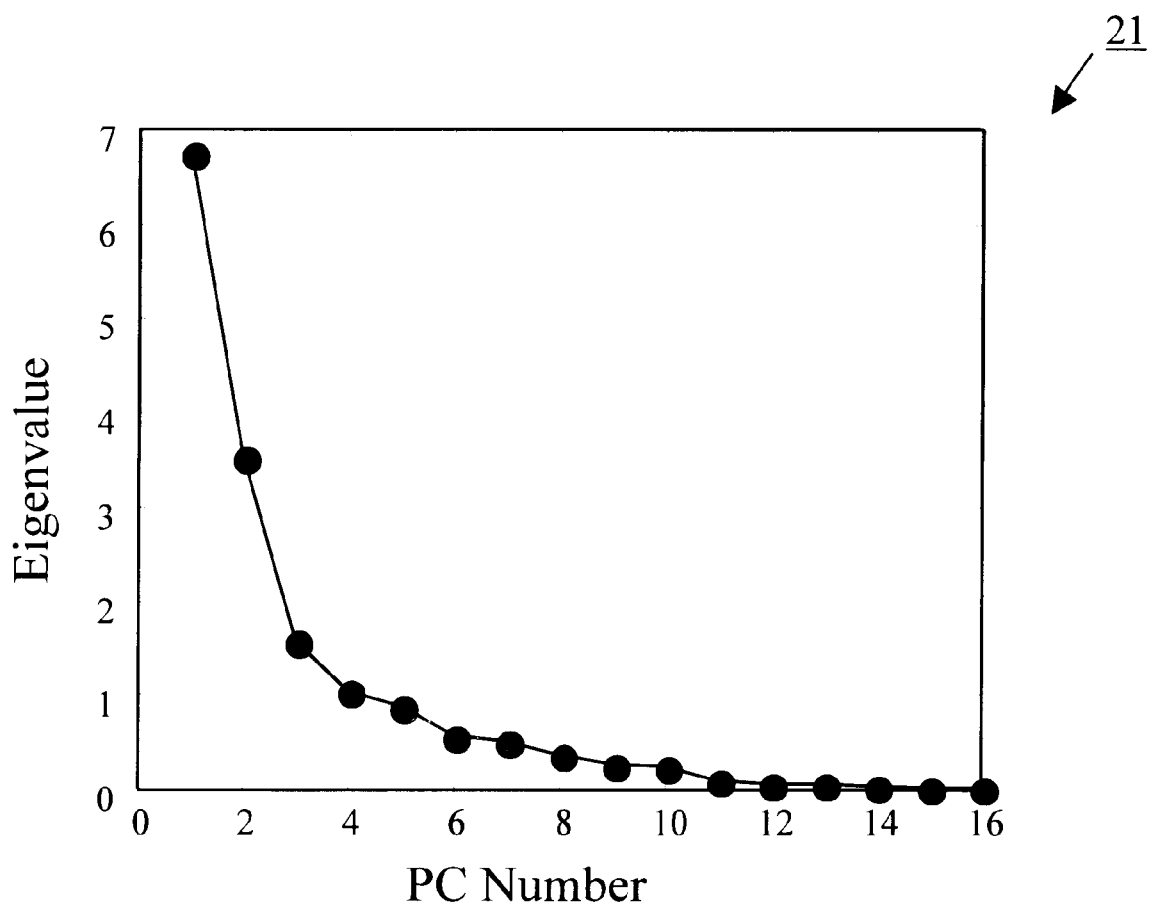
FIG. 2 is a plot of the eigenvalues of process variables, measured using the method of FIG. 1, after autoscaling.

To determine the number of principal components to retain in the PCA model, the percent variance captured by the PCA model may be analyzed (see Table 3 below) in combination with a plot of eigenvalues as a function of PCs 21 (see FIG. 2). In one example, four PCs captured about 80.8% of the variance in the data. Higher-order PCs had eigenvalues less than unity and did not describe any systematic variance in the system. Thus, four PCs were determined to be adequate for the PCA model.

TABLE 3

Percent Variance Captured by PCA Model

| Principal Component | Eigenvalue of CoV (X) | % Variance this PC | % Variance Cumulative |
|---|---|---|---|
| 1 | 6.85e + 000 | 42.83 | 42.83 |
| 2 | 3.58e + 000 | 22.37 | 65.21 |
| 3 | 1.50e + 000 | 9.37 | 74.58 |
| 4 | 9.96e − 001 | 6.22 | 80.80 |
| 5 | 8.57e − 001 | 5.36 | 86.16 |
| 6 | 5.95e − 001 | 3.72 | 89.88 |
| 7 | 4.71e − 001 | 2.94 | 92.82 |
| 8 | 3.49e − 001 | 2.18 | 95.00 |
| 9 | 2.93e − 001 | 1.83 | 96.84 |
| 10 | 2.46e − 001 | 1.54 | 98.37 |
| 11 | 8.81e − 002 | 0.55 | 98.92 |
| 12 | 5.96e − 002 | 0.37 | 99.29 |
| 13 | 5.12e − 002 | 0.32 | 99.61 |
| 14 | 3.42e − 002 | 0.21 | 99.83 |
| 15 | 1.46e − 002 | 0.09 | 99.92 |
| 16 | 1.29e − 002 | 0.08 | 100.00 |

Figure 3:
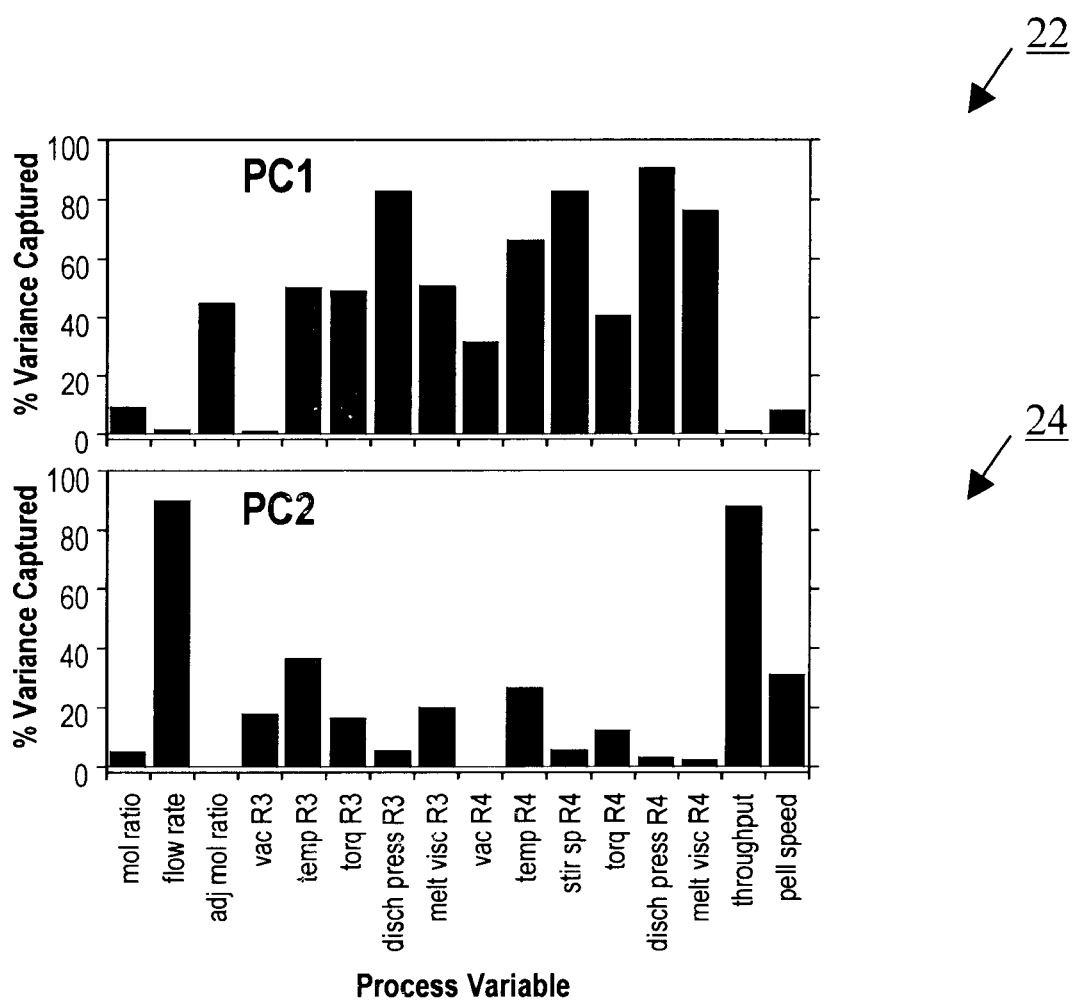
FIG. 3 is a graph of the percent of captured variance for each process variable for the first two principal components (PCs) of the principal components analysis (PCA) model of the present invention.

Information regarding the amount of variance for each process variable $X_i$ captured by individual PCs in the PCA model of this example is presented in FIG. 3. PC1 22 describes about 43% of the total variance in the data, but no single process variable $X_i$ provides an exclusive contribution. The five process variables $X_i$ that individually contributed more than about 50% of the captured variance in PC1 22 were discharge pressure in R3, temperature in R4, stirring speed in R4, discharge pressure in R4, and melt viscosity in R4. The two process variables $X_i$ that individually contributed more than about 50% of the captured variance in PC2 24 were flow rate and throughput.

Figure 4:
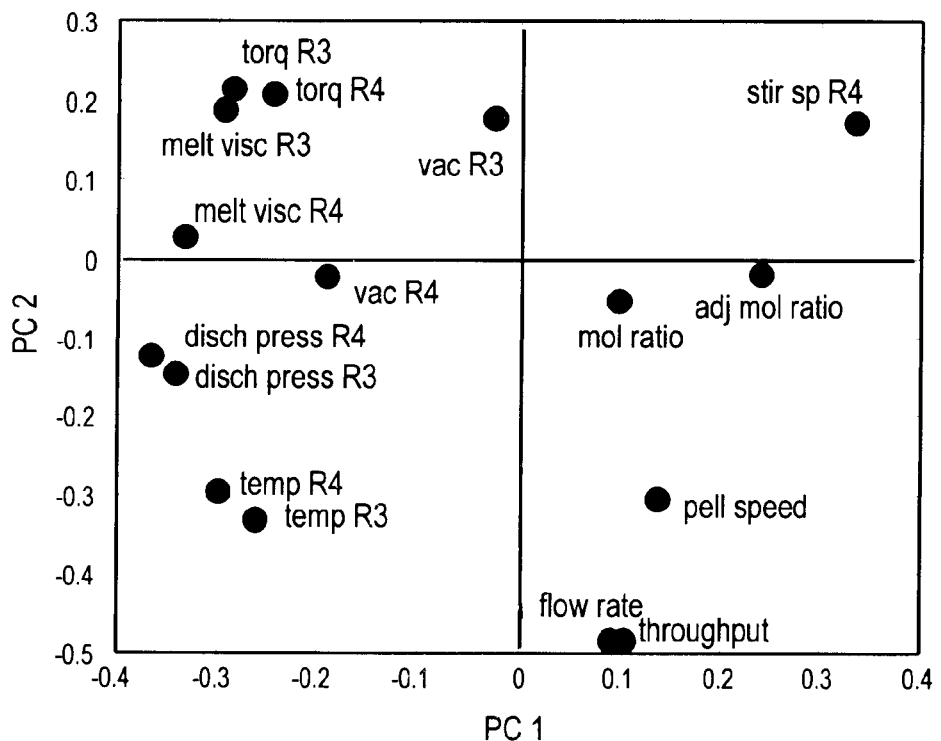
FIG. 4 is a loadings plot from the PCA model of FIG. 3.

Referring to FIG. 4, a loadings plot 26 may also be used as a diagnostic tool for the PCA model and process variables $X_i$. The loadings plot 26 determines which variables are important for describing variation in the data set. When a given process variable $X_i$ contributes a significant variation to the PC, the absolute value of the loading of the variable will be close to unity. When the process variable $X_i$ does not contribute a significant variation to the PC, the absolute value of the loading of the variable will be close to zero. The different signs of the loadings indicate that the process variables inversely contribute to the variance described by the PC. In the above example, discharge pressure in R4 contributes the most to PC1, while vacuum in R3 contributes the least. Most of the contribution to PC2 is provided by flow rate and throughput, while vacuum in R4 and adjusted molar ratio contribute the least to PC2.

Figure 5:
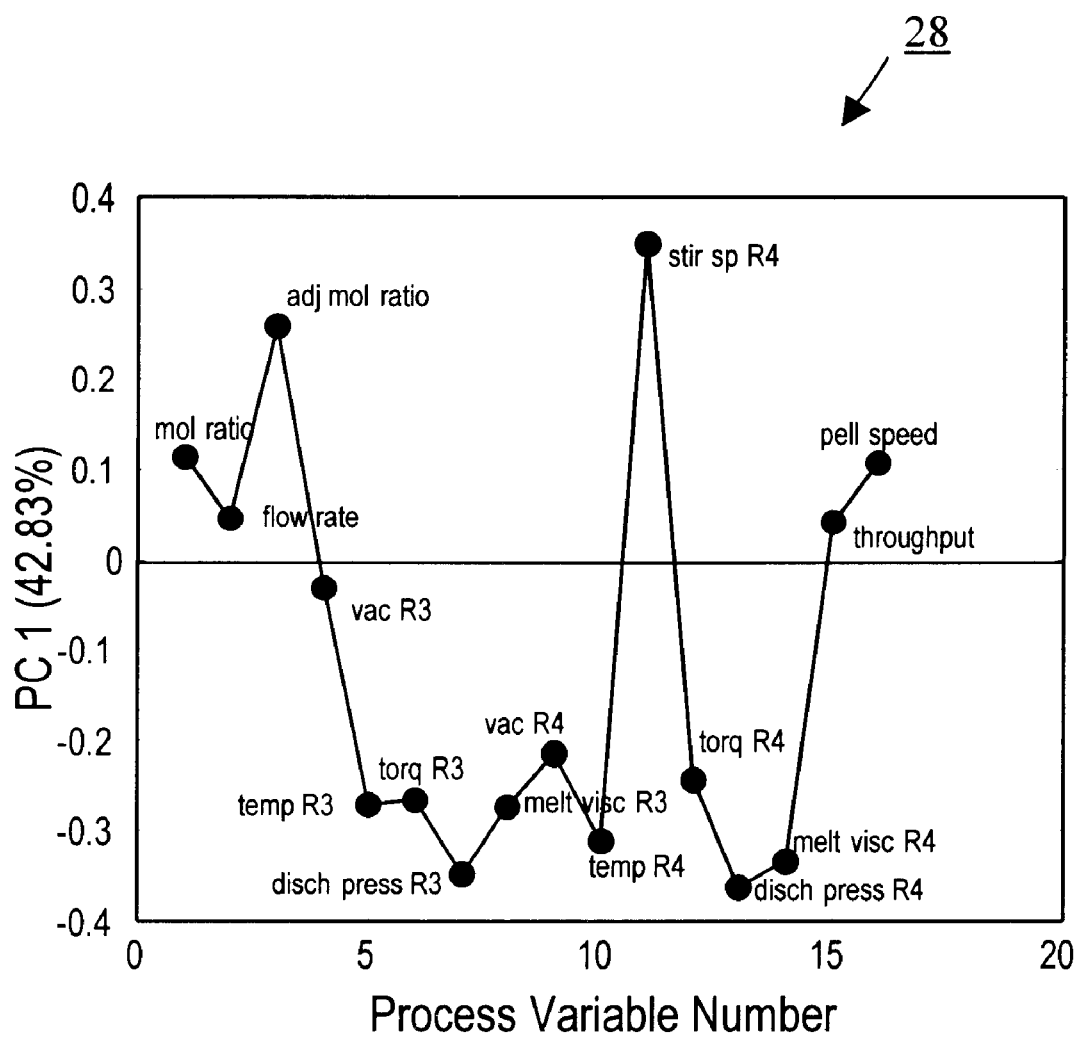
FIG. 5 is a loadings plot for the first PC from the PCA model of FIG. 3.
Figure 6:
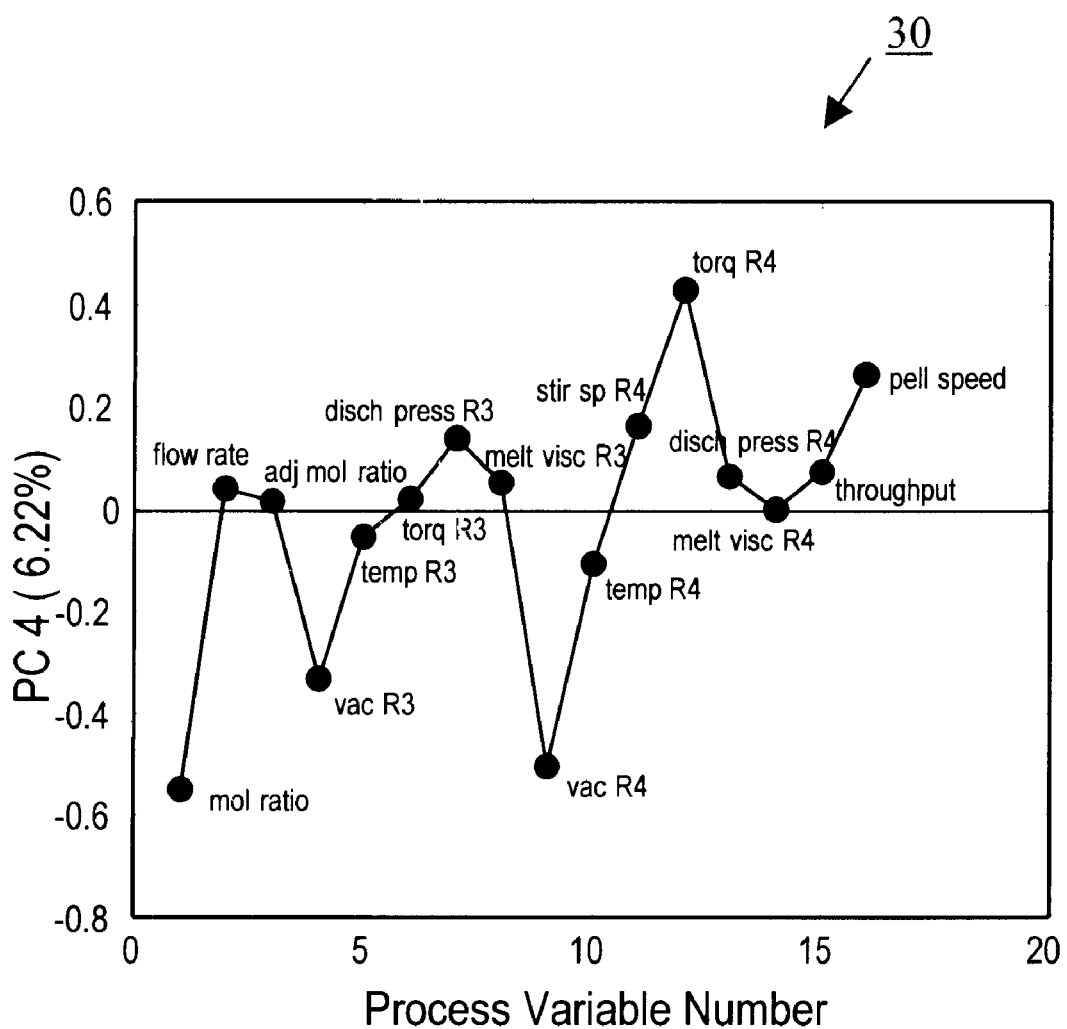
FIG. 6 is a loadings plot for the fourth PC from the PCA model of FIG. 3.

It is also important to note the amount of variation described by a PC when interpreting loadings. A variable with a large loading value contributes significantly to a particular PC. However, the variable may not be truly important if the PC does not describe a large amount of the variation in the data set. FIG. 5 presents the values of loadings of process variables $X_i$ to PC1 28 and FIG. 6 presents the values of loadings of process variables $X_i$ to PC4 30. For example, vacuum in R4 has a large loading of about −0.5 to PC4 30 and a relatively small loading of about −0.2 to PC1 28. However, PC1 28 describes about seven times more variation in the data set.

Another step in the multivariate statistical process analysis method 10 of the present invention is establishing a correlation between process variables $X_i$ 32. Multivariate methods are capable of detecting changes in the correlation structure of a group of variables that may not be detected by univariate methods. The correlation structure in the data set may be visualized using, for example, a correlation analysis. The correlation between a pair of variables x and y is defined as:

$$R_{x,y} = \sum_{i}^{N} (x_i - \bar{x})(y_i - \bar{y}) / (\sigma_x \sigma_y (N-1)), \quad (3)$$

where R is the correlation coefficient and N is the number of data points. The correlation coefficient R is between −1 and 1 and is independent of the scale of x and y values. For an exact linear relation between x and y, R=1 if increasing x values correspond to increasing y values and R=−1 if increasing x values correspond to decreasing y values. R=0 if the variables are independent.

Results of the correlation analysis of process variables $X_i$ may be presented as pseudocolor maps, and may, optionally, be reordered using, for example, a k-nearest neighbor (KNN) cluster analysis. This hierarchical cluster analysis determines the similarity of process variables $X_i$ based on their measured properties.

In the example discussed above, two pairs of process variables $X_i$, temperature in R3 and temperature in R4 and flow rate and throughput, had correlation coefficients close to 1. Stirring speed in R4 and both temperature in R4 and discharge, pressure in R4 had correlation coefficients close to −1. A further step in the multivariate statistical process analysis method 10 of the present invention is establishing a correlation between process variables $X_i$ and product variables $Y_i$ 34. An immediate benefit of this step 34 may include the ability to forecast product quality based upon measurements involving only process variables $X_i$. As discussed above, during the manufacturing of melt polycarbonate, material quality may be monitored as a function of several product variables $X_i$.

Initial analysis of the correlation structure in the combined data set of process variables $X_i$ and product variables $Y_i$ may also be performed using correlation analysis. For example, a pseudocolor correlation map of the process variables $X_i$ and product variables $Y_i$ may be reordered using KNN cluster analysis. In the example discussed above, none of the individual product variables $Y_i$ correlated with process variables $X_i$ with a correlation coefficient of about 1. A strong inverse correlation (R≈−1) was found between the stirring speed in R4 and pellet IV.

Figure 7:
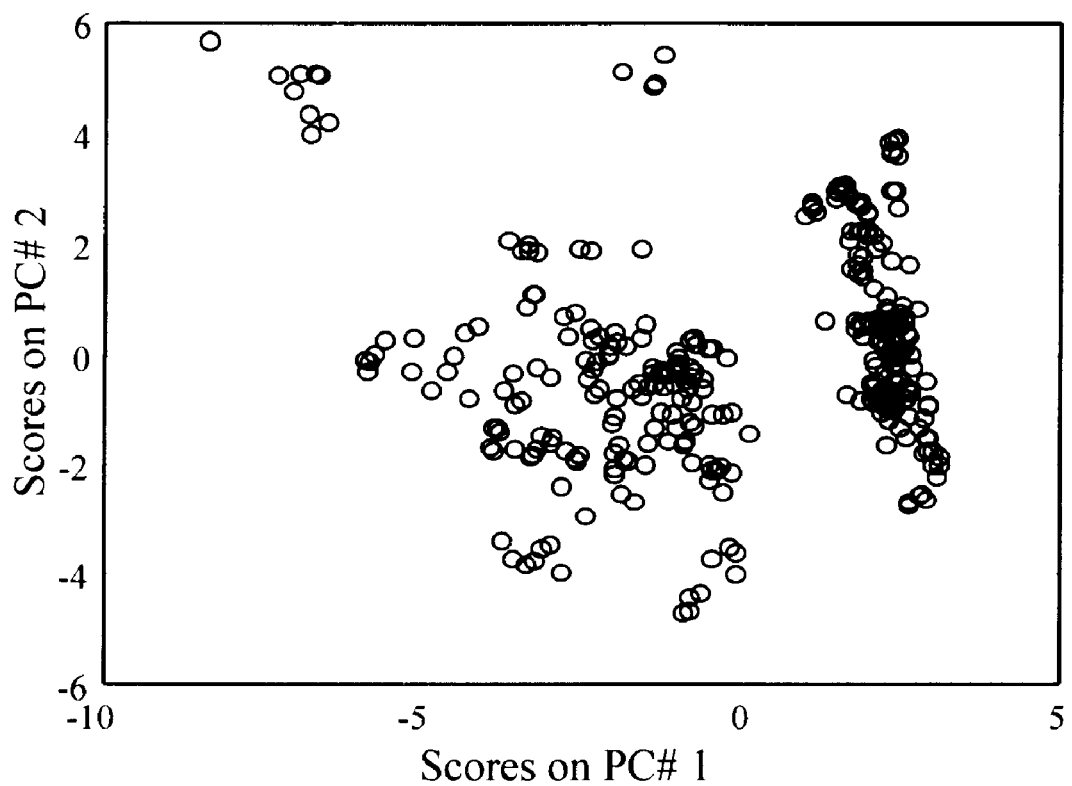
FIG. 7 is a plot of the first two scores for the PCA model of FIG. 3.

A detailed analysis of the correlation between process variables $X_i$ and product variables $Y_i$ may be performed using PCA of the process variables $X_i$ and analyzing a PC scores plots. FIG. 7 shows the plot of the first two scores for PCA 36. The plot 36 illustrates a general relationship between samples of melt polycarbonate resin manufacture and different process variable $X_i$ conditions. Several possible clusters of data may be assigned on the scores plot 36. Intuitively, polycarbonate produced under similar process conditions should have similar properties.

A more in-depth understanding of the relationships between process variables $X_i$ and product variables $Y_i$ may be obtained given additional knowledge of the data. In particular, the data points on the scores plots may be labeled according to information about product variables $Y_i$. Histogram plots may be used to determine the distribution of product variables $Y_i$ and to assign labels to respective portions of the distribution. For example, the correlation between process variables $X_i$ captured by the first two PCs and product variables $Y_i$ such as melt flow ratio, pellet IV, Fries concentration, and melt polycarbonate grade may be plotted. Analysis of histograms of these product variables $Y_i$ may, for example, indicate that melt flow ratio and pellet IV are more rightly arranged in clusters on the histogram plots than, for example, Fries concentration. This variation in distribution may be explained by more pronounced effects of the process variables $X_i$ on Fries formation.

Referring again to FIG. 1, the multivariate statistical process analysis method 10 of the present invention further includes the generation of an inference model for predicting and analyzing the melt polycarbonate production process and its performance 38. For example, pellet IV and Fries concentration of manufactured polycarbonate resin may be predicted using "virtual analyzers," analyzing only the information from process variables $X_i$. For this application, a multivariate calibration method such as partial least-squares (PLS) regression may be used. The quality of the developed PLS models for quantitation of pellet IV and Fries concentration may be evaluated using, for example, the root mean squared error of calibration (RMSEC). Performance of the PLS models developed for quantitation of pellet IV and Fries concentration may also be validated using a leave-one-out cross-validation algorithm. The root mean squared error of cross-validation (RMSECV) may be used to estimate the ability of the models to predict pellet IV and Fries concentration. RMSECV is essentially the standard deviation of the predicted values minus laboratory estimated values (i.e. the standard deviation of the test set residuals). A large RMSECV indicates poor correlation with the reference method and/or poor precision.

Figure 8:
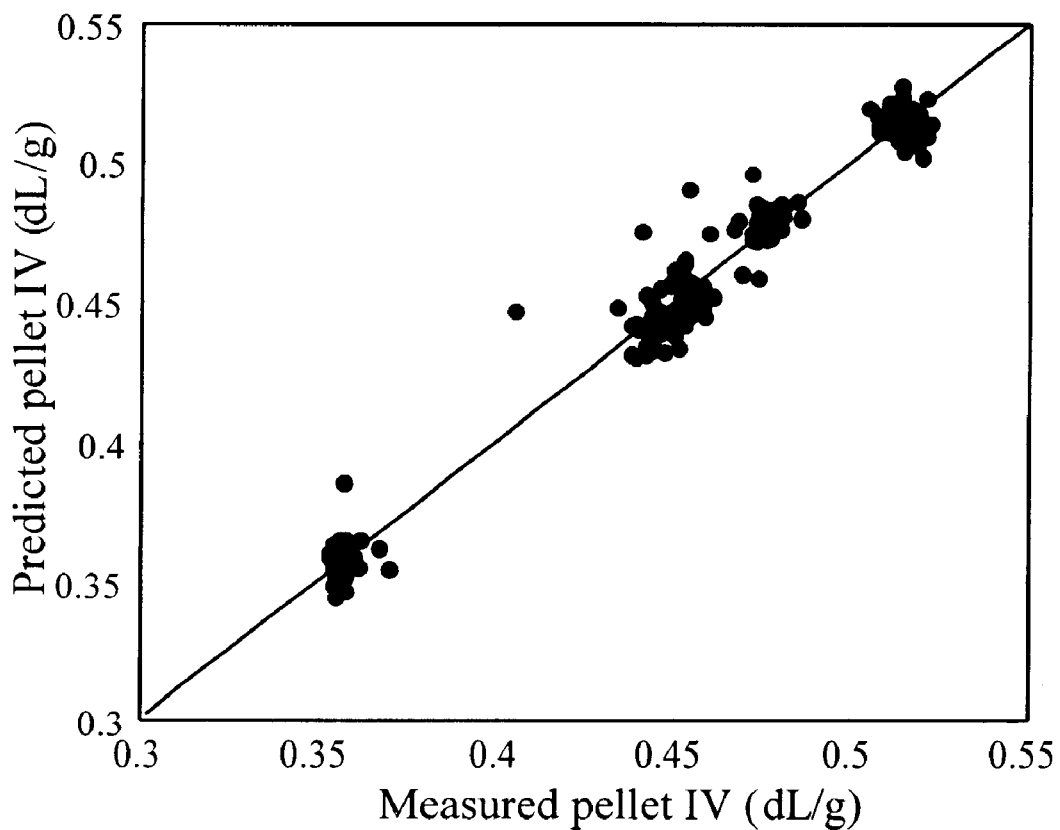
FIG. 8 is a plot of the result of the prediction of pellet intrinsic viscosity (IV) using only process variables.
Figure 9:
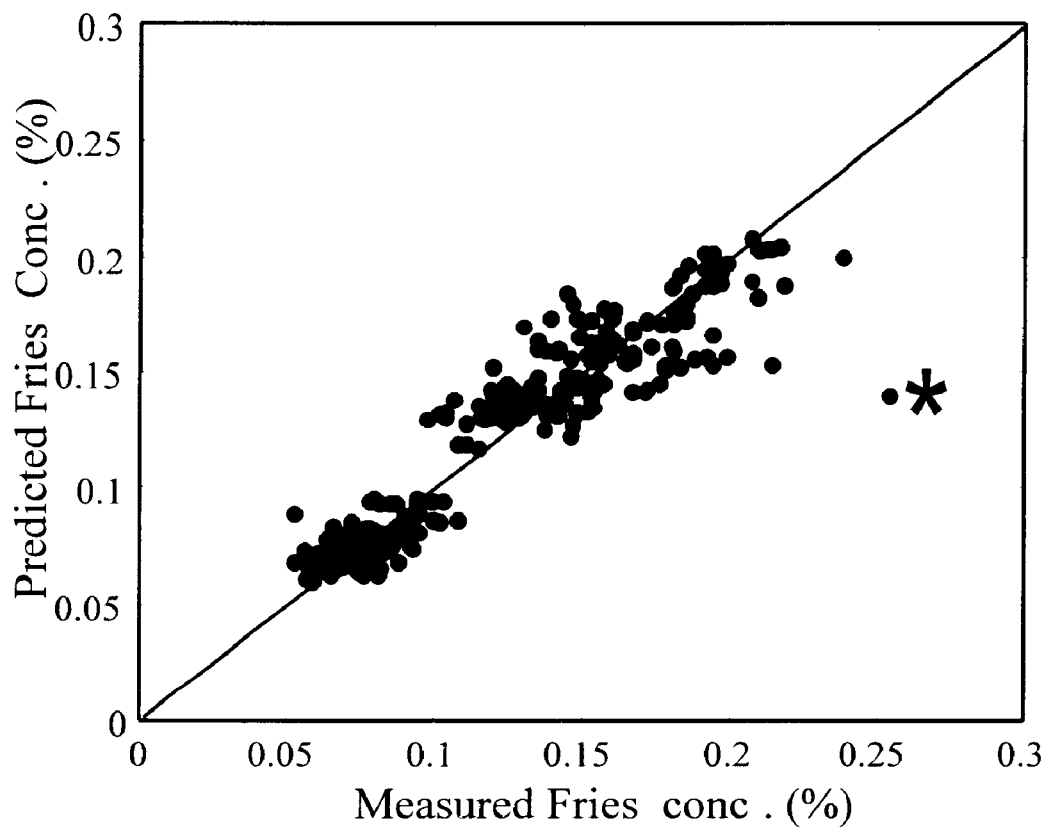
FIG. 9 is a plot of the result of the prediction of Fries concentration using only process variables.

In the example discussed above, the results of the prediction of pellet IV and Fries concentration using only process variables $X_i$ are presented in FIGS. 8 and 9, respectively. For quantitation of pellet IV, a six-factor PLS regression model was found to be adequate. This model accounted for about 85% of the variance in process variables $X_i$ and about 98% of the pellet IV variance. For quantitation of Fries concentration, a four-factor PLS regression model was found to be optimal. It accounted for about 75% of the variance in process variables $X_i$ and about 90% of Fries concentration variance. A summary of the performance of the PLS models for the prediction of pellet IV and Fries concentration from the measured process variables $X_i$ is presented in Table 4.

TABLE 4

Summary of Calibration Model Performances

| Product Variable | Root Mean Squared Error of Calibration | Root Mean Squared Error of Cross-Validation | $R^2$ |
|---|---|---|---|
| Pellet IV | 0.00703 dL/g | 0.00758 dL/g | 0.99 |
| Fries Concentration | 0.0146% Fries | 0.0152% Fries | 0.90 |

To ensure normal manufacturing plant operation, the quality of collected process variables $X_i$ may be evaluated using statistical tools such as multivariate control charts and multivariate contribution plots, among others. This allows for the detection of faults and the diagnosis of problems in the process variables $X_i$ 40. Multivariate control charts use two statistical indicators of the PCA model, such as Q and $T^2$ values plotted as a function of manufactured sample. The significant principal components of the PCA model are used to develop the $T^2$-chart and the remaining PCs contribute to the Q-chart. The Q residual is the squared prediction error and describes how well the PCA model fits each sample. It is a measure of the amount of variation in each sample not captured by K principal components retained in the model:

$$Q_i = e_i e_i^T = x_i(I - P_k P_k^T)X_i^T, \quad (4)$$

where $e_i$ is the ith row of E, $x_i$ is the ith sample in X, $P_k$ is the matrix of the k loading vectors retained in the PCA model (where each vector is a column of $P_k$), and I is the identity matrix of appropriate size (n×n). The Q residual chart monitors the deviation from the PCA model for each sample. The sum of normalized squared scores, known as Hotelling's $T^2$ statistic, is a measure of the variation within the PCA model and allows for the identification of statistically anomalous samples. $T^2$ is defined as:

$$T_i^2 = t_i \lambda^{-1} t_i^T = x_i P \lambda^{-1} P^T x_i^T, \quad (5)$$

where $t_i$ is the ith row of $T_k$, the matrix of k scores vectors from the PCA model, and $\lambda^{-1}$ is the diagonal matrix containing the inverse of the eigenvalues associated with the k eigenvectors (PCs) retained in the model. The $T^2$-chart monitors the multivariate distance of a new sample from a target value in the reduced PCA space.

Figure 10:
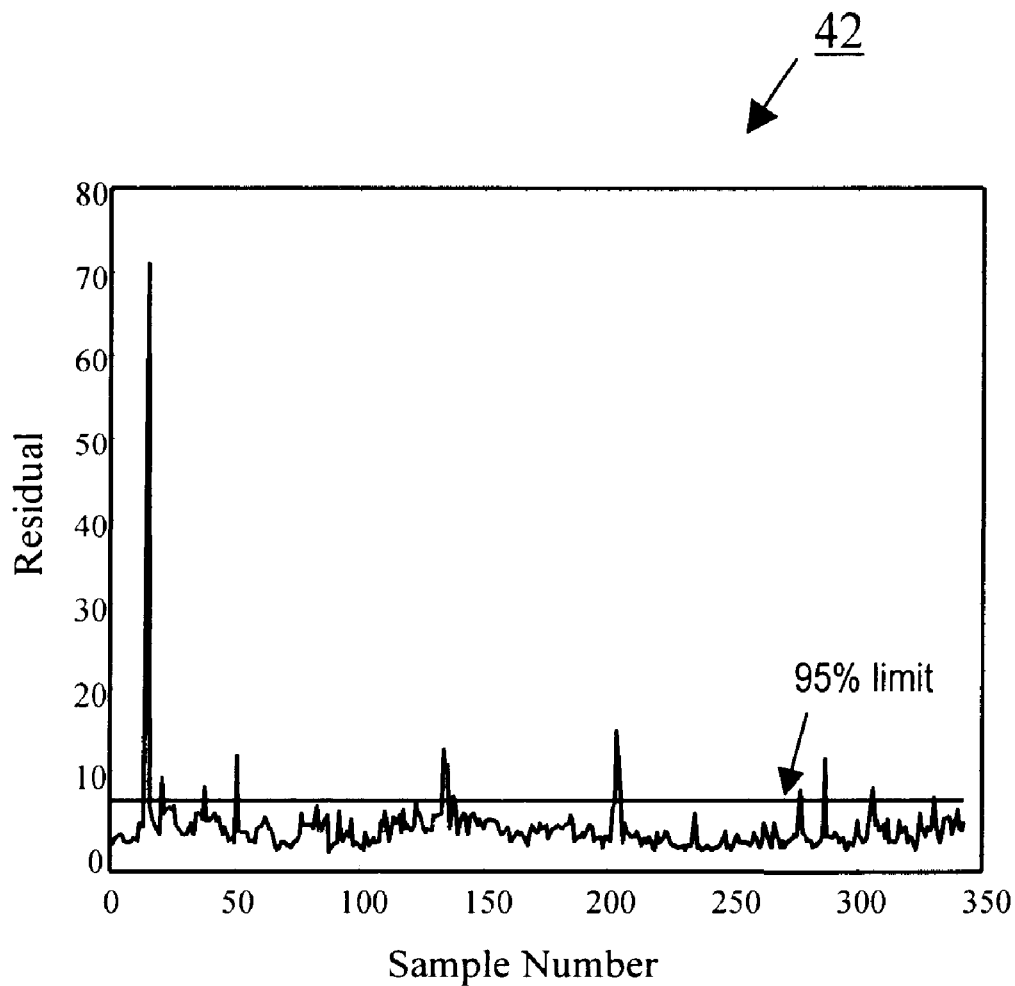
FIG. 10 is a Q control chart for the multivariate statistical process analysis of the production of melt polycarbonate resin.
Figure 11:
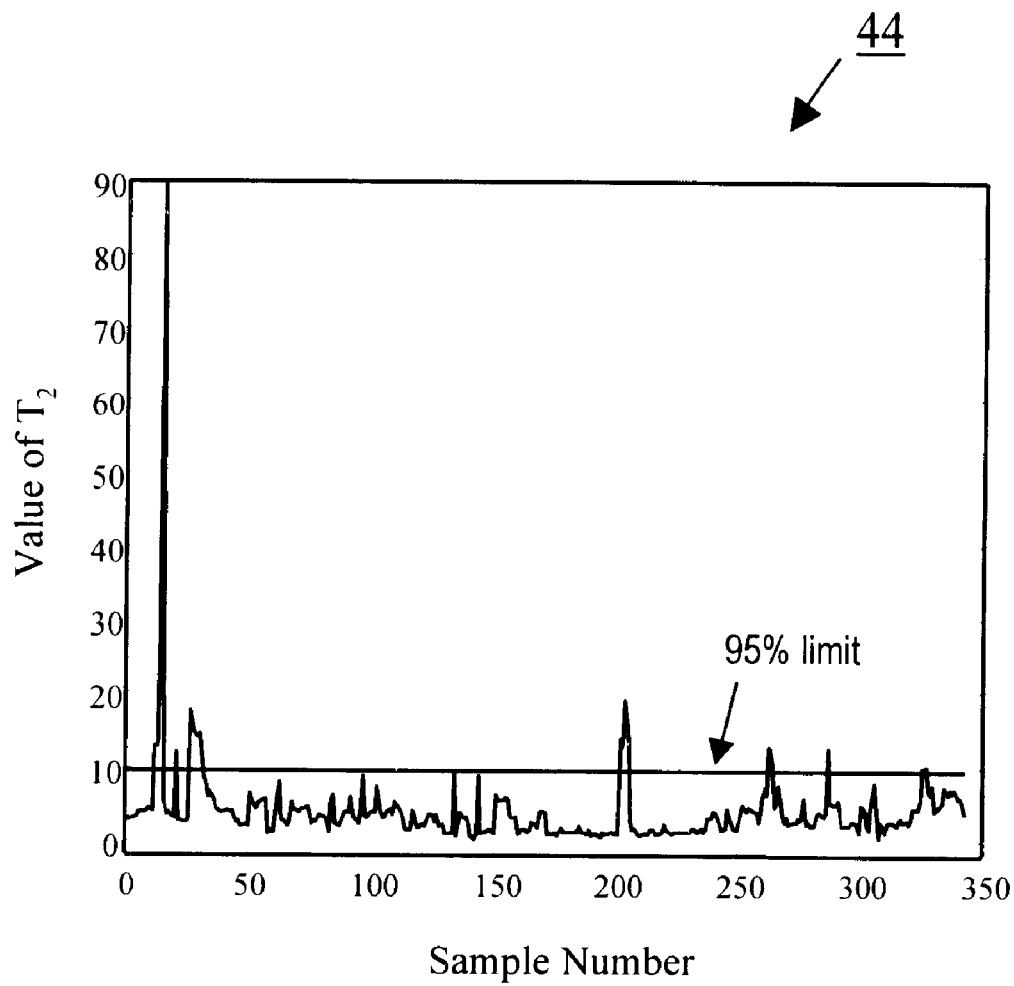
FIG. 11 is a T² control chart for the multivariate statistical process analysis of the production of melt polycarbonate resin.

Referring to FIGS. 10 and 11, the Q and $T^2$ control charts may be statistical indicators in the multivariate statistical process control of the production of melt polycarbonate resin 42 and 44. These charts illustrate samples that exceed some predetermined confidence limit, for example the 95% confidence limit, described by the PCA model. The contribution plots of Q residuals and Hotelling's $T^2$ statistic may provide an indication of which process variables $X_i$ cause problems in a given sample. A large Q residual may occur, for example, due to data collection errors or process disturbances.

Figure 12:
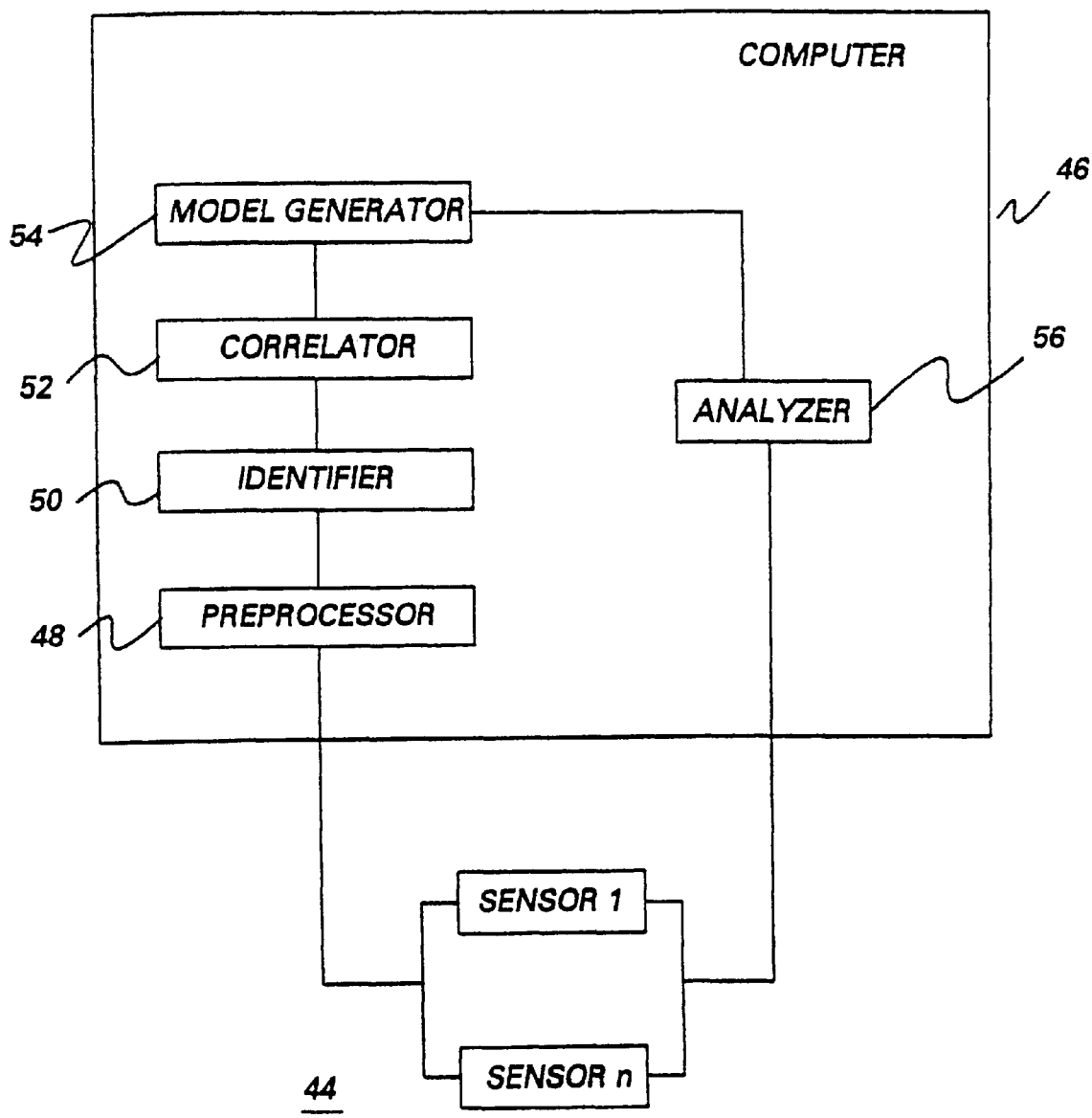
FIG. 12 is a functional block diagram of a computerized multivariate statistical process analysis system for the production of melt polycarbonate.

Referring to FIG. 12, a multivariate statistical process analysis (MSPA) system 42 for the consistent production of melt polycarbonate includes a plurality of sensors 44 for collecting manufacturing process data and a computer 46 for determining the relative importance of various process variables $X_i$ and developing an inference model to predict such outcomes as Fries concentration, pellet intrinsic viscosity (IV), and melt polycarbonate grade. The computer 46 may also be used to detect and identify process variables $X_i$ causing abnormal performance on-line. The system 42 of the present invention thus allows a manufacturing plant staff to monitor process performance, better understand it, and make sound business decisions.

Structurally, the computer 46 typically includes inputs/outputs, a memory, and a processor for receiving, sending, storing, and processing signals and data to operate, monitor, record, and otherwise functionally control the operation of the system 42. The computer 46 may include software, hardware, firmware, and other similar components for functionally controlling the operation of the system 42. The computer 46 may be a single device, or it may be a plurality of devices working in concert. The computer 46 is preferably in communication with all of the other components of the system 42. The input/output devices may include, for example, a keyboard and a mouse for entering data and instructions into the computer 46. A video display allows the user or process operator to view what the computer 46 has accomplished. Other output devices may include, for example, a printer, a plotter, a synthesizer, and speakers. The memory typically includes a random-access memory (RAM) and a read-only memory (ROM). The memory may also include other types of memory, such as programmable read-only memory (PROM), erasable programmable read-only memory (EPROM), and electrically erasable programmable read-only memory (EEPROM). The memory also preferably includes an operating system that executes on the processor. The operating system performs basic tasks which include recognizing input from input devices, sending output to output devices, keeping track of files and directories, and controlling various peripheral devices. The memory may also contain one or more databases. The processor accepts data and instructions from the memory and performs various calculations. The processor may include an arithmetic logic unit (ALU), which performs arithmetic and logical operations, and a control unit, which extracts instructions from the memory. Optionally, the computer 46 may also include a modem or other network connection, a mass storage device, and any other suitable peripheral. The above-described computer 46 may take the form of a hand-held digital computer, a personal computer, a workstation, a mainframe computer, and a supercomputer.

The computer's memory preferably contains a number of programs or algorithms for functionally controlling the operation of the system 42, including a preprocessor 48, for preprocessing collected process variable $X_i$ and product variable $Y_i$ data, and an identifier 50, for identifying the process variables $X_i$ of importance in, for example, the melt polycarbonate manufacturing process. The preprocessor 48 may, for example, include an algorithm for scaling each of the measurements related to the process variables $X_i$ and product variables $Y_i$. The identifier 50 may, for example, include an algorithm for performing principal components analysis (PCA). The computer 46 may also contain a correlator 52, for performing a correlation analysis between process variables X and process variables $X_i$ and product variables $Y_i$, and a model generator 54, or generating a "virtual analyzer," used to understand and predict the performance of the manufacturing process. The model generator 54 may, for example, include an algorithm for performing partial least-squares (PLS) regression. Further, the computer 46 may contain an analyzer 56 for detecting faults and diagnosing problems with monitored process variables $X_i$ that may lead to inferior-polycarbonate product. This may be accomplished through the use of multivariate control charts. Process and product data may be analyzed using multivariate techniques included in, for example, a chemometrics software package, such as PLSToolbox (Version 2.0, Eigenvector Research, Inc., Manson Wash.). This software package may operate, for example, with MATLAB (Version 5.3, The Mathworks, Inc., Natick, Mass.).

The present invention has been described with reference to examples and preferred embodiments. Other examples and embodiments may achieve the same results. Variations in and modifications to the present invention will be apparent to those skilled in the art and the following claims are intended to cover all such equivalents.

What is claimed is:

1. A computerized system for the production of melt polycarbonate, comprising:

a plurality of sensors operable for obtaining a plurality of measurements relating to a plurality of predetermined process variables;

wherein the plurality of predetermined process variables comprise process variables selected from the group consisting of molar ratio, adjusted molar ratio, catalyst concentration, flow rate, vacuum, temperature, torque, discharge pressure, melt viscosity, stirring speed, throughput, and pellet speed;

a preprocessor operable for preprocessing each of the plurality of measurements for multivariate statistical analysis;

an identifier operable for identifying which of the plurality of predetermined process variables affect each of a plurality of predetermined product variables, individually and in combination;

a correlator operable for correlating the plurality of predetermined process variables and the plurality of predetermined product variables, individually and in combination;

a model generator operable for modeling the relationship between the plurality of predetermined process variables and the plurality of predetermined product variables; and an analyzer operable for analyzing the plurality of predetermined process variables to ensure that the value of each of the plurality of predetermined process variables is within a predetermined range.

2. The system of claim 1, wherein the preprocessor further comprises an algorithm for scaling each of the plurality of measurements.

3. The system of claim 1, wherein the identifier further comprises an algorithm for performing pattern recognition analysis.

4. The system of claim 1, wherein the identifier further comprises an algorithm for performing principal components analysis (PCA).

5. The system of claim 1, wherein the correlator further comprises an algorithm for performing correlation analysis.

6. The system of claim 1, wherein the model generator further comprises an algorithm for performing multivariate calibration.

7. The system of claim 1, wherein the model generator further comprises an algorithm for performing partial least-squares (PLS) regression.

8. The system of claim 1, wherein the analyzer further comprises an algorithm for formulating and analyzing multivariate control charts.

9. The system of claim 1, wherein the plurality of predetermined product variables comprise product variables selected from the group consisting of Fries concentration, melt flow ratio (MFR), pellet intrinsic viscosity (IV), end cap (EC), yellowness index (YI), and melt polycarbonate grade.

10. A computerized system for the production of melt polycarbonate, comprising:
   a plurality of sensors operable for obtaining a plurality of measurements relating to a plurality of predetermined process variables;
   wherein the plurality of predetermined process variables comprise process variables selected from the group consisting of molar ratio, adjusted molar ratio, catalyst concentration, flow rate, vacuum, temperature, torque, discharge pressure, melt viscosity, stirring speed, throughput, and pellet speed;
   a preprocessor having a scaling algorithm, operable for preprocessing each of the plurality of measurements for multivariate statistical analysis;
   an identifier having a pattern recognition analysis algorithm, operable for identifying which of the plurality of predetermined process variables affect each of a plurality of predetermined product variables, individually and in combination;
   a correlator having a correlation analysis algorithm, operable for correlating the plurality of predetermined process variables and the plurality of predetermined product variables, individually and in combination;
   a model generator having a multivariate calibration algorithm, operable for modeling the relationship between the plurality of predetermined process variables and the plurality of predetermined product variables; and
   an analyzer having a multivariate control chart algorithm, operable for analyzing the plurality of predetermined process variables to ensure that the value of each of the plurality of predetermined process variables is within a predetermined range.

11. The system of claim 10, wherein the identifier further comprises an algorithm for performing principal components analysis (PCA).

12. The system of claim 10, wherein the model generator further comprises an algorithm for performing partial least-squares (PLS) regression.

13. The system of claim 10, wherein the plurality of predetermined product variables comprise product variables selected from the group consisting of Fries concentration, melt flow ratio (MFR), pellet intrinsic viscosity (IV), end cap (EC), yellowness index (YI), and melt polycarbonate grade.

14. A computerized method for the production of melt polycarbonate, comprising the steps of:
   obtaining a plurality of measurements relating to a plurality of predetermined process variables;
   wherein the plurality of predetermined process variables comprise process variables selected from the group consisting of molar ratio, adjusted molar ratio, catalyst concentration, flow rate, vacuum, temperature, torque, discharge pressure, melt viscosity, stirring speed, throughput, and pellet speed;
   preprocessing each of the plurality of measurements for multivariate statistical analysis;
   identifying which of the plurality of predetermined process variables affect each of a plurality of predetermined product variables, individually and in combination;
   correlating the plurality of predetermined process variables and the plurality of predetermined product variables, individually and in combination;
   modeling the relationship between the plurality of predetermined process variables and the plurality of predetermined product variables; and
   analyzing the plurality of predetermined process variables to ensure that the value of each of the plurality of predetermined process variables is within a predetermined range.

15. The method of claim 14, wherein the step of preprocessing each of the plurality of measurements for multivariate statistical analysis further comprises scaling each of the plurality of measurements.

16. The method of claim 14, wherein the step of identifying which of the plurality of predetermined process variables affect each of the plurality of predetermined product variables further comprises performing principal components analysis (PCA).

17. The method of claim 14, wherein the step of correlating the plurality of predetermined process variables and the plurality of predetermined product variables further comprises performing correlation analysis.

18. The method of claim 14, wherein the step of modeling the relationship between the plurality of predetermined process variables and the plurality of predetermined product variables further comprises performing partial least-squares (PLS) regression.

19. The method of claim 14, wherein the step of analyzing the plurality of predetermined process variables to ensure that the value of each of the plurality of predetermined process variables is within a predetermined range further comprises formulating and analyzing multivariate control charts.

20. The method of claim 14, wherein the plurality of predetermined product variables comprise product variables selected from the group consisting of Fries concentration, melt flow ratio (MFR), pellet intrinsic viscosity (IV), end cap (EC), yellowness index (YI), and melt polycarbonate grade.

21. A computerized method for controlling the process for the production of melt polycarbonate, the method comprising the steps of:
   measuring the process for the production of melt polycarbonate with a plurality of sensors, the plurality of sensors operable for collecting data representative of a plurality of predetermined process variables and a plurality of predetermined product variables;
   wherein the plurality of predetermined process variables comprise process variables selected from the group consisting of molar ratio, adjusted molar ratio, catalyst concentration, flow rate, vacuum, temperature, torque, discharge pressure, melt viscosity, stirring speed, throughput, and pellet speed;

generating a surrogate variable, using a computer in communication with the plurality of sensors, the computer having software operable for performing multivariate statistical analysis, the surrogate variable having a value representative of a control state of the process for the production of melt polycarbonate, the surrogate variable further being a function of a plurality of intermediate variables, each of the plurality of intermediate variables being a weighted function of the plurality of process variables and the plurality of product variables;

determining which of the plurality of intermediate variables primarily contribute to the value of the surrogate variable when the value of the surrogate variable is outside of a predetermined limit;

identifying which of the plurality of process variables primarily contribute to the value of each of the plurality of intermediate variables; and modifying the process for the production of melt polycarbonate to change each of the plurality of process variables such that the value of the surrogate variable is brought within the predetermined limit.

22. The method of claim 21, wherein measuring the process for the production of melt polycarbonate with a plurality of sensors further comprises scaling each of the plurality of measurements.

23. The method of claim 21, wherein generating a surrogate variable further comprises performing pattern recognition analysis.

24. The method of claim 21, wherein generating a surrogate variable further comprises performing principal components analysis (PCA).

25. The method of claim 21, wherein determining which of the plurality of intermediate variables primarily contribute to the value of the surrogate variable when the value of the surrogate variable is outside of a predetermined limit further comprises performing correlation analysis.

26. The method of claim 21, wherein determining which of the plurality of intermediate variables primarily contribute to the value of the surrogate variable when the value of the surrogate variable is outside of a predetermined limit further comprises performing multivariate calibration.

27. The method of claim 21, wherein identifying which of the plurality of process variables primarily contribute to the value of each of the plurality of intermediate variables further comprises performing partial least-squares (PLS) regression.

28. The method of claim 21, wherein modifying the process for the production of melt polycarbonate to change each of the plurality of process variables such that the value of the surrogate variable is brought within the predetermined limit further comprises formulating and analyzing multivariate control charts.

29. The method of claim 21, wherein the plurality of predetermined product variables comprise product variables selected from the group consisting of Fries concentration, melt flow ratio (MFR), pellet intrinsic viscosity (IV), end cap (EC), yellowness index (YI), and melt polycarbonate grade.

* * * * *